(12) United States Patent
Komitov et al.

(10) Patent No.: US 11,988,913 B2
(45) Date of Patent: May 21, 2024

(54) OPTICALLY AND ELECTRICALLY ADDRESSABLE LIQUID CRYSTAL DEVICE

(71) Applicant: HIGHVISTEC GMBH, Witterswil (CH)

(72) Inventors: Lachezar Komitov, Gothenburg (SE); Mohammed Ibn Elhaj, Witterswil (CH)

(73) Assignee: HIGHVISTEC GMBH, Witterswil (CH)

( * ) Notice: Subject to any disclaimer, the term of this patent is extended or adjusted under 35 U.S.C. 154(b) by 197 days.

(21) Appl. No.: 17/628,531

(22) PCT Filed: Jul. 6, 2020

(86) PCT No.: PCT/EP2020/069026
§ 371 (c)(1),
(2) Date: Jan. 19, 2022

(87) PCT Pub. No.: WO2021/013524
PCT Pub. Date: Jan. 28, 2021

(65) Prior Publication Data
US 2022/0365382 A1  Nov. 17, 2022

(30) Foreign Application Priority Data

Jul. 19, 2019  (EP) .................................... 19187289

(51) Int. Cl.
*G02F 1/133*    (2006.01)
*G02F 1/1343*   (2006.01)

(52) U.S. Cl.
CPC ...... *G02F 1/13324* (2021.01); *G02F 1/13439* (2013.01)

(58) Field of Classification Search
None
See application file for complete search history.

(56) References Cited

U.S. PATENT DOCUMENTS

| | | | |
|---|---|---|---|
| 6,233,027 B1 | 5/2001 | Unno et al. | |
| 2002/0008796 A1 | 1/2002 | Kung | |

(Continued)

FOREIGN PATENT DOCUMENTS

| | | | |
|---|---|---|---|
| CN | 101571633 | * | 4/2009 |
| EP | 3 444 662 A1 | | 2/2019 |

(Continued)

*Primary Examiner* — Ashok Patel
(74) *Attorney, Agent, or Firm* — Maschoff Brennan

(57) ABSTRACT

The present invention relates to a liquid crystal device comprising a first portion, a second portion and a liquid crystal layer, wherein said first portion comprises a first substrate, said first substrate at least partially covered by a first electrode layer, wherein said second portion comprises a second substrate, said second substrate at least partially covered by a second electrode layer, wherein at least one of said first and second electrode layers comprises a plurality of electrodes that are electrically insulated of each other, wherein one of said first and second electrode layers is at least partially covered by said at least one photovoltaic semiconductor conversion layer and wherein said first portion is parallel to said second portion and at least one of them is transparent, wherein said liquid crystal layer is disposed between said first and second portions.

11 Claims, 13 Drawing Sheets

(56) References Cited

U.S. PATENT DOCUMENTS

| | | |
|---|---|---|
| 2010/0245731 A1 | 9/2010 | Limketkai et al. |
| 2011/0317121 A1 | 12/2011 | Lin et al. |
| 2014/0028957 A1 | 1/2014 | Yang et al. |

FOREIGN PATENT DOCUMENTS

| | | |
|---|---|---|
| WO | 2011/074374 A1 | 6/2011 |
| WO | 2019/098721 A1 | 5/2019 |

\* cited by examiner

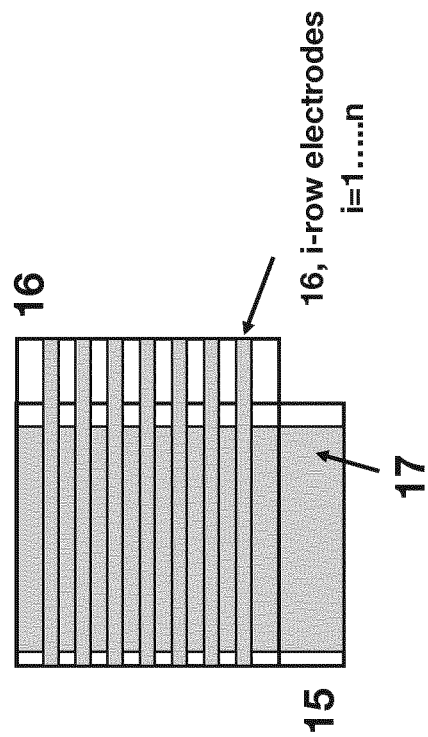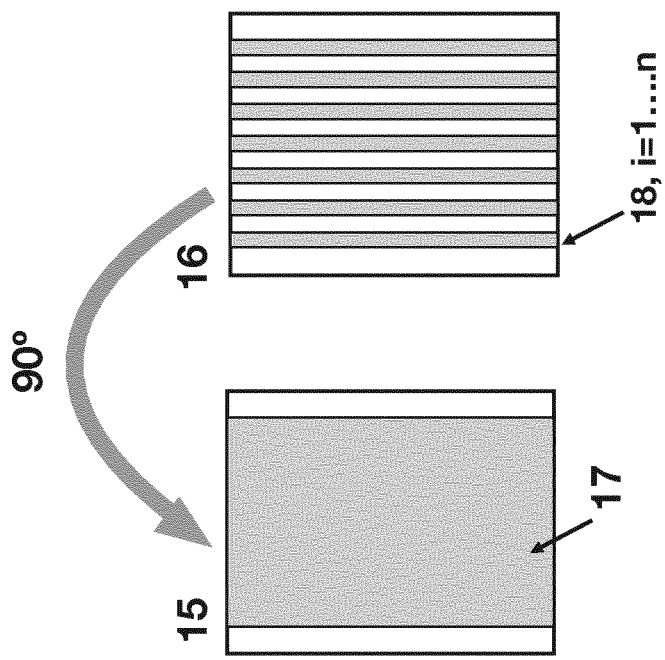
Fig.3

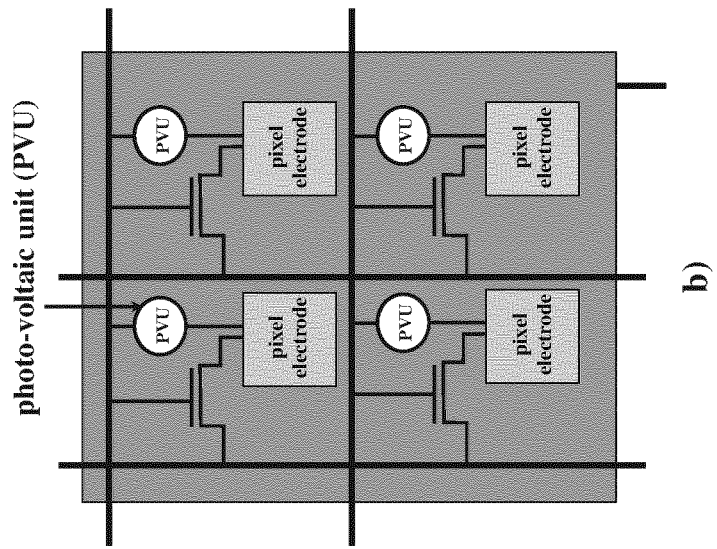
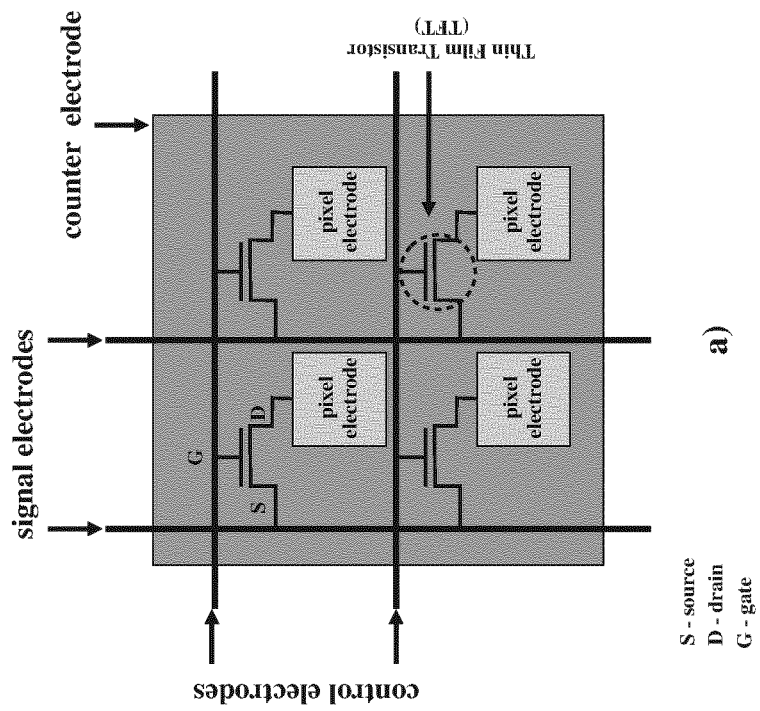
Fig. 11

OPTICALLY AND ELECTRICALLY ADDRESSABLE LIQUID CRYSTAL DEVICE

FIELD OF THE INVENTION

The present invention relates to a liquid crystal device adapted to be able to be driven by sunlight.

BACKGROUND

The present invention relates to an optically and/or electrically addressable liquid crystal device suitable for controlling the light transmission/reflection intensity by incorporated plurality of photovoltaic units alone or assisted by external electric field, thus being suitable to be used as optically addressed liquid crystal light shutter, for smart windows, for instance. This device can separately or simultaneously be addressed by application of external electric field, likewise the conventional liquid crystal displays, and thus to display images as well as alphabetic information.

Liquid crystal known since 1888 have received today a wide range of applications in the Information Technology. Smart phones, lap tops, tablets, computers, TV screens, LC projectors, welding helmets, googles, VR and HM displays, etc. are most of the products available on the current market incorporating liquid crystal devices [Liquid Crystal Displays; Fundamentals and technology, by R. Chen; John Wiley & Sons, 2011] Liquid crystal devices are also used successfully in other areas such as photonic devices such as light shutters, SLM, reflectors, mirrors, controllable lasers etc. [Liquid Crystal Photonics, by V. Chigrinov, Nova Science Publishers Inc. 2014].

Liquid crystal devices, displays and photonics devices, operate on the principle of controlling the optical properties of the device by application of external electric field and therefore these devices need to be powered by external electric source. Hence the availability of power supply is a necessary prerequisite for the operation of these devices. However, one of the major problems of the portable device, in which are incorporated liquid crystal displays (LCD), such as laptops, tablets, electronic books, smart phones, watches etc., is the life of battery powering these devices.

In the modern architecture, and in nowadays also in automotive and aircraft industries, the transparent/semi-transparent surface, such as the windows, are important elements. They may have different functions and therefore the requirements imposed on them are different. With the development of the technology, the interest to windows with controllable functions, the so called "smart windows", is continuously increasing. Moreover, displaying different kind of information by the smart windows is obviously a further step in the development of the smart windows functionality.

Energy saving, especially in buildings, as well as reducing the negative effect of the sun light on the conformability in vehicles and aircrafts, in particular, demands the employment of smart windows.

Application of light shutters' technologies have been widely studied for smart windows purposes because of their capability to control the throughput of sunlight and solar heat into a building as well as in vehicles, by applying a small applied electric field, for instance. Such light shutters can thus provide a comfortable environment for occupants while saving energy for heating, cooling, and artificial lighting.1-6]

[1] A. Llordes, G. Garcia, J. Gazquez, D. J. Milliron, Nature 2013, 500, 323.
[2] Z. Xie, X. Jin, G. Chen, J. Xu, D. Chen, G. Shen, Chem. Commun. 2014, 50, 608.
[3] C.-C. Wu, J.-C. Liou, C.-C. Diao, Chem. Commun. 2015, 51, 12625.
[4] H. Shin, S. Seo, C. Park, J. Na, M. Han, E. Kim, Energy Environ. Sci. 2016, 9, 117.
[5] A. Llordes, Y. Wand, A. Fernadez-Martinez, P. Xiao, T. Lee, A. Poulain, O. Zandi, C. A. S. Cabezas, G. Henkelman, D. J. Milliron, Nat. Mater. 2016, 15, 1267.
[6] G. Cai, P. Darmawan, X. Cheng, P. S. Lee, Adv. Energy Mater. 2017, 7, 1602598.

A thermally or optically switchable light shutter has also received attention recently because their optical appearance can be changed automatically between the transparent and translucent states by ambient light conditions without any externally applied power or signal [7-15], the so called autonomous smart windows.

[7] H.-K. Kwon, K.-T. Lee, K. Hur, S. H. Moon, M. M. Quasim, T. D. Wilkinson, J.-Y. Han, H. Ko, I.-K. Han, B. Park, B. K. Min, B.-K. Ju, S. M. Morris, R. H. Friend, D.-H. Ko, Adv. Energy Mater. 2015, 5, 1401347.
[8] E. Lee, D. Kim, J. Yoon, ACS Appl. Mater. Interfaces 2016, 8, 26359.
[9] S.-W. Oh, J.-M. Baek, T.-H. Yoon, Opt. Express 2016, 24, 26575.
[10] K. G. Gutierrez-Cuevas, L. Wang, Z. Zheng, H. K. Bisoyi, G. Li, L.-S. Tan, R. A. Vaia, Q. Li, Angew. Chem., Int. Ed. 2016, 55, 13090.
[11] H. K. Bisoyi, Q. Li, Chem. Rev. 2016, 116, 15089.
[12] L. Wang, H. K. Bisoyi, Z. Zheng, K. G. Gutierrez-Cuevas, G. Singh, S. Kumar, T. J. Bunning, Q. Li, Mater. Today 2017, 20, 230.
[13] X. Liang, S. Guo, M. Chen, C. Li, Q. Wang, C. Zou, C. Zhang, L. Zhang, S. Guo, H. Yang, Mater. Horiz. 2017, 4, 878.
[14] S. Bogati, R. Basnet, W. Graf, A. Georg, Sol. Energy Mater. Sol. Cells 2017, 166, 204.
[15] S.-W. Oh, J.-M. Baek, S.-H. Kim, T.-H. Yoon, RSC Adv. 2017, 7, Recently another kind of autonomous smart windows have attracted very strong interest—the smart windows with incorporated photo-photovoltaic unit (PVU) as a power source, with special focus on those using liquid crystal device as a light shutter [U.S. Pat. No. 6,233,027B1].

The major function of the windows in the buildings is to ensure a comfortable in-house illumination. To control the incoming sun light intensity, and thus to ensure a comfortable in-house illumination, is of great importance in some countries and especially during the summer. Such a control is possible to realise through control of the optical properties of the smart window. There are a number of methods reported in the literature [19, 20]

[19] J. Garcia-Amorós, D. Velasco, Beilstein J. Org. Chem. 2012, 8, 1003.
([20] L. Wang, Liquid Crystals, 2016, 2062, Adv. Funct. Yang Zhoi et all, Mater. 2018, 1800113), which generally can be classified into two categories:
- self-powered, i.e. the control of the windows, which optical properties are realised by the windows themselves as a function of the sun light intensity or/and the temperature of the window due to the sun light heating effect.
- with external control, the window optical properties are controlling by an applied electric field from external power source.

Liquid crystals appears to be very attractive materials for smart windows due to their large electro-optic coefficient, i.e. low electric field may cause a significant change of their optical properties and resulting thus efficient control of the incoming light. However, entering in the field of smart windows, Liquid Crystal Display Technology open another powerful function for smart windows besides the light protection, to display simultaneously or separately images and alphanumeric information.

According to the invention, however, the operation of the optically and/or electrically addressable liquid crystal device can be based either on the effect of the incoming light (ambient natural light or writing light, from laser source, for instance) alone or in combination with an applied external electric field as well as entirely on an applied electric field, likewise in the conventional LCDs. An important group in the self-sustainable category of smart windows is the one employing photovoltaic unit incorporated in the smart windows ([21] U.S. Pat. No. 6,233,027B1, 2001; US 2014/0028957 A1, [22] A. Y. Fuh et al, Liquid Crystals, 2018 VOL. 45, NO. 6, 864-871) or packed together with the window [23], H.-K. Kwon et al, Adv. Energy Mater. 2015, 5, 1401347, [24] L. Komitov, Private Communication, 1978]. In this group of self-sustainable smart windows, the photovoltaic unit (PVU) plays important role as a power source for controlling the optical properties of this kind of smart windows, the so called self-sustainable smart windows (SSW).

The present invention relates to an optically and/or electrically addressed liquid crystal devices suitable to be used as controllable smart windows, light projectors and information devices as well as for art in-house illumination. Besides the optical addressing this device can be complementary or entirely addressed by an applied electric field, which can be used for enhancement of the light sensitivity of the device as well as for displaying also of information of different kind, such as alpha-numerical and images.

Hitherto, an optically and electrically addressed liquid crystal space light modulation (OESLM) device is proposed. This device is of transmissive, transreflective or reflective kind depending on the whether the illumination with readout light incident thereto from the side opposite to an observer (transmissive) or incident thereto from the side of an observer (reflective or transreflective).

In the prior of art OSLM, the photo-voltaic semiconductor conversion layer 6 is covering the entire area of the substrate 2. However, the current materials from which the photovoltaic semiconductor conversion layer are strongly absorbing light in the visible range of the light spectrum and therefore are coloured, which, due to light absorption, results in a decrease of the total intensity of the transmitted light through the OSLM at Vph=0, i.e. at low intensity of the illumination light from the source 11.

Moreover, it is difficult to cover the entire work area of OSLM device with uniform PVU layer, especially in those with large size, which in turn causes worsening the performance of the OSLM device.

It is also impossible to control the sensitivity of the OSLM device locally as well as to display by the same OSLM device some additional information in form of alphanumeric and image information.

A further, typical example of prior art liquid crystal devices, powered by photovoltaic cells, are disclosed in US 2011/0317121 A1. The integrated in the display device photovoltaic cells, according to this example, are generating a photocurrent under light illumination, which with suggested device architecture, is transmitted to the display driving circuit but not directly to the display unit, which can contain also a liquid crystal.

Employment of photovoltaic cells in combination with liquid crystal display device are also disclosed in WO20110743374 A1 and US2002/0008796A1, where the photovoltaic cells are used mainly for recycling light energy and charging batteries, rather than directly to switch the liquid crystal molecules and thus change the optical appearance of the liquid crystal display device.

Another example of liquid crystal device, powered by incorporated in the device photovoltaic unit (PVU) is disclosed EP 3 444 662 A1, wherein the PVU is deposited onto entire inner substrate area of liquid crystal device and thus having in direct contact with the liquid crystal enclosed in between the cell substrates. However, since the PVU has a strong absorption at certain light wavelength, the cell appears coloured and has low light transmission.

SUMMARY OF THE INVENTION

Please note that any embodiment or part of embodiment could be combined in any way. All examples herein should be seen as part of the general description and therefore possible to combine in any way in general terms.

The various aforementioned features of the embodiments may be combined in any way if such combination is not clearly contradictory.

The aim of the present invention is to overcome the disadvantages of the liquid crystal devices powered directly by PVU (EP 3 444 662 A1), such as low light transmission, by patterning the photovoltaic layer and/or device electrodes thus providing the liquid crystal device with pixel structure of the photovoltaic layer and/or electrode pattern, resulting:
a) better light transmission
b) better control of the dimming performance of the device
c) displaying information content by addressing with light and/or electric field (feature which is absent in the devices of prior of art)

Accordingly, an object of the present invention is to provide a multifunctional liquid crystal device, which could be optically or/and electrically addressed (OESLM), possessing high spatial resolution and high optical sensitivity, good transmisivity, transleflectivity and reflectivity, respectively.

An object of the present invention is to introduce a patterned electrode on one or on the both OESLM substrates thus to make it possible to increase selectively the sensitivity of the OESLM device in certain areas of the device.

An object of the present invention is also to enable OESLM to display information content, such as alpha numeric and images, separately or in parallel with the dimming light protection function, Another objective of the present invention is to make it possible to superimpose information displayed by the OESLM device, according to the invention, whether written optically and/or electrically.

An object of the present invention is to increase the total transparency of OESLM device at the state when the PVU units are not generating photo-voltage Vph=O, i.e. at low intensity of the activating light (the ambient natural light or the one coming from laser, for instance).

Another objective is to reduce the usage of batteries for powering the portable devices by using entirely or partially the voltage generated by photo-voltaic units (PVU) incorporated into OESLM.

An objective according to the present invention is to power devices, which otherwise allow only optical addressing.

Another object of the present invention is to provide a liquids crystal device (OESLM) with good light transmission, transreflectivity and reflectivity, respectively.

An object of the present invention, according to the invention, is to broaden the functionality of the device by incorporating a light source in some of the OESLM pixels, preferably in all of them.

To enable the electronic driving of the OESLM device, employing TFT technique, according the present invention, and to use of Bluetooth technique for controlling the electronic driving, is another object of the invention.

Yet another object of the present invention is to provide simple and inexpensive production process of OESLM.

According to a first aspect of the present invention, a liquid crystal device is provided, said device comprising a first portion, a second portion and a liquid crystal layer; wherein said first portion comprises a first substrate, said first substrate at least partially covered by a first electrode layer; wherein said second portion comprises a second substrate, said second substrate at least partially covered by a second electrode layer; wherein at least one of said first and second portions is transparent; wherein at least one of said first and second electrode layers comprises a plurality of electrodes that are electrically insulated of each other; wherein at least one of said first and second portions comprises at least one photovoltaic semiconductor conversion layer, wherein one of said first and second electrode layers is at least partially covered by said at least one photovoltaic semiconductor conversion layer; and wherein said first portion is substantially parallel to said second portion and wherein said liquid crystal layer is disposed between said first and second portions.

By having the liquid crystal layer disposed between the first and second portions entails that the device forms a sandwich structure.

A photovoltaic conversion semiconductor layer may also be a photovoltaic unit (PVU).

Photovoltaic unit (PVU) is a sandwich structure consisting generally of the following types of thin layers deposited on a solid substrate:
a) electron transporting layer,
b) semiconductor conversion layer (heterojunction structure consisting of an interpenetrating network of electron donor and acceptor materials, called Bulk Hetero-Junction layer-BHJ), cased also photovoltaic (PV) layer, and
c) hole transporting layer.

Depending on whether the electron transporting layer or hole transporting layer is deposited onto the substrate, the PVU, i.e. the photovoltaic conversion semiconductor layer, is of conventional or inverted type, respectively.

Of great importance for the effective performance of a liquid crystal cell with incorporated PVU is that the photo-generated bias by the PVU under illumination, the so-called open circuit voltage Voc, is applied directly to the liquid crystal layer. It is important to notice that, for optimising the magnitude of Voc applied to the liquid crystal layer, the electron and the hole transporting layer, respectively may consist of more than one single layer, i.e. possessing a multilayered structure.

At least one of the substrates may be made of a plastic material. At least one of the substrates may be a glass material. At least one of the substrates may be rigid or flexible. One of the substrates may be a mirror.

The liquid crystal layer of the liquid crystal layer enclosed in between the substrates may be nematic, a nematic gel, cholesteric or smectic. The liquid crystal may be nematic, a nematic gel, cholesteric or smectic containing dichroic dye or a combination thereof. The liquid crystal may have an incorporated polymer network.

According to at least one exemplary embodiment, said first portion comprises said at least one photovoltaic conversion semiconductor layer, and wherein said at least one photovoltaic conversion semiconductor layer is arranged between said first electrode layer and said liquid crystal layer.

By arranging a photovoltaic conversion semiconductor layer between an electrode layer and a liquid crystal layer, the photovoltaic conversion semiconductor layer does not have to be in physical contact with any of the other two layers.

According to at least one exemplary embodiment, said second portion further comprises a second photovoltaic conversion semiconductor layer, wherein said second electrode layer is at least partially covered by said second photovoltaic conversion semiconductor layer, and wherein said second photovoltaic conversion semiconductor layer is arranged between said second electrode layer and said liquid crystal layer.

According to at least one exemplary embodiment, said first electrode layer is arranged in physical contact with and at least partially covered by a first photovoltaic conversion semiconductor layer and said second electrode layer is arranged in physical contact with and at least partially covered by a second photovoltaic conversion semiconductor layer.

That the first and second electrode layers are arranged in physical contact with a respective photovoltaic conversion semiconductor layers does not exclude the presence of other photovoltaic semiconductor layers.

According to at least an exemplary embodiment, said first electrode layer comprises a first plurality of electrodes that are electrically insulated of each other and said second electrode layer comprises a second plurality of electrodes that are electrically insulated of each other, wherein said first plurality of electrodes are extended in a first longitudinal direction and said second plurality of electrodes are extended in a second longitudinal direction, wherein said first longitudinal direction is orthogonal to said second longitudinal direction.

That a plurality of electrodes are electrically insulated of each other is to be understood as that each one of the individual electrodes that constitute the plurality of electrodes are electrically insulated of every other electrode in said plurality. By having a plurality of electrode that are electrically insulated of each other, the functionality of the individual electrodes is independent of the functionality of the rest of the electrodes.

The first and second plurality of electrodes may both be longitudinally extending stripes. By having the electrodes of the first layer extend in a direction orthogonal to the electrodes of the second layer, a pixelated structure is achieved. The pixels are defined by the overlap between an electrode of the first layer and an electrode of the second layer.

According to at least one exemplary embodiment, said first portion comprises a first transparent conductive layer arranged in physical contact with and at least partially covering said first photovoltaic conversion semiconductor layer and said second portion comprises a second transparent conductive layer arranged in physical contact with and at least partially covering said second photovoltaic conversion semiconductor layer.

According to at least one exemplary embodiment, said first transparent conductive layer comprises a plurality of transparent electrodes that are electrically insulated of each other and extended in said first longitudinal direction; wherein said second transparent conductive layer comprises a plurality of transparent electrodes that are electrically insulated of each other and extended in said second longitudinal direction; wherein said first photovoltaic conversion semiconductor layer comprises a first plurality of photovoltaic conversion semiconductor elements that are electrically insulated of each other and extended in at least said first longitudinal direction; wherein said second photovoltaic conversion semiconductor layer comprises a second plurality of photovoltaic conversion semiconductor elements that are electrically insulated of each other and extended in in at least said second longitudinal direction; and wherein said first plurality of electrodes at least partially overlaps with said first plurality of transparent electrodes and said first plurality of photovoltaic conversion semiconductor elements, and said second plurality of electrodes at least partially overlaps with said second plurality of transparent electrodes and said second plurality of photovoltaic conversion semiconductor elements.

According to at least one exemplary embodiment, said first photovoltaic conversion semiconductor layer comprises a first plurality of photovoltaic conversion semiconductor elements that are electrically insulated of each other in said first longitudinal direction and said second longitudinal direction such that said first plurality of photovoltaic conversion semiconductor elements are distributed in a first plane coinciding with said first photovoltaic conversion semiconductor layer; wherein said second photovoltaic conversion semiconductor layer comprises a second plurality of photovoltaic conversion semiconductor elements that are electrically insulated of each other in said first longitudinal direction and said second longitudinal direction such that said second plurality of photovoltaic conversion semiconductor elements are distributed in a second plane coinciding with said second photovoltaic conversion semiconductor layer; wherein said first plane and said second plane are parallel; and wherein said first plurality of photovoltaic conversion elements and said second plurality of photovoltaic conversion elements are insulated of each other and spaced at least along a direction orthogonal to said first plane and said second plane.

The first and second plurality of photovoltaic semiconductor conversion elements are distributed in two different planes that are parallel but not coinciding. The overlap between the layers of the first portions and the layers of the second portion of the device forms a pixelated structure. At least one photovoltaic semiconductor conversion element from each layer is comprised in every pixel in the pixelated structure. When viewed in a direction that is orthogonal to the first and second plane, i.e. along a normal direction to these planes, photovoltaic semiconductor conversion elements from the first plane may overlap with photovoltaic semiconductor conversion elements from the second plane. Photovoltaic semiconductor conversion elements from the first and second planes may be spaced in a direction coinciding with the first plane and/or the second plane. This would entail that the elements, as seen from the normal direction, are not overlapping at all.

According to at least one exemplary embodiment, one of said first and second plurality of electrodes or one of said first and second plurality of transparent electrodes are thin film transistor driven transparent pixel electrodes and one of said first and second plurality of electrodes or one of said first and second plurality of transparent conductive electrodes are common transparent electrodes with system of colour filters and black mask beneath, wherein said thin film transistor driven conductive transparent pixel electrodes are driven simultaneously or independently by said first or second plurality of photovoltaic conversion semiconductor elements.

According to an exemplary embodiment, one of said first and second photovoltaic conversion semiconductor layers is of conventional type whereas the other photovoltaic conversion semiconductor layers is of inverted type.

According to an exemplary embodiment, at least one of said first and second portions further comprises an alignment layer arranged in physical contact with said liquid crystal layer.

The alignment layer may be made of photoalignment material.

According to an exemplary embodiment said first transparent conductive layer is arranged in physical contact with and at least partially covered by a first alignment layer and said second transparent conductive layer is arranged in physical contact with and at least partially covered by a second alignment layer, and wherein said first and second alignment layers are arranged in physical contact with said liquid crystal layer arranged between said first and second portions.

According to an exemplary embodiment at least one of said first and second photovoltaic conversion semiconductor layers has a laminated structure comprising a semiconductor layer for charge generation enclosed between two thin films made of charge transporting material.

The electrons and holes charge transporting layers might consist of more than one single layer, performing the same function.

According to an exemplary embodiment, the device further comprises two polarisers, wherein each one of said two polarisers is either transmissive or transreflective, wherein said first and second portions are arranged between said two polarisers.

According to an exemplary embodiment, the transparent conductive layers are connected to an electronic driving system.

According to an exemplary embodiment, the device further comprises a means for storing electrical energy, such as a battery, and further comprising at least one light source connected to said means for storing electrical energy.

By having a means for storing electrical energy, the device may store energy during periods of high electricity production for use during periods of low electricity production. For example, the device may store energy during the day when there is plenty of sunlight in order to be able to power the device during the evening or the night when there is little to no sunlight. This makes the device flexible and at least partially eliminates the need for external powering, thereby minimizing energy consumption.

By having at least one light source, the pixelated device may be used to display information even though it is placed in a dark surroundings. The at least one light source may be driven by energy from the means for storing electrical energy, or any other source of energy. Preferably, the device comprises one light source per pixel, i.e. one light source per overlap between electrodes in the first layer and in the second layer. The light source may be a Q-dot, µ-led, OLED etc.

According to an exemplary embodiment, the device further comprises a means for receiving external electromagnetic signals, such as a Bluetooth device.

By having the device being able to receive external information through electromagnetic signals, the pixelated structure can be made to display images or alphanumerical information or similar.

These and other objectives, features and advantages of the present invention will become more apparent considering the following liquid crystal description of the preferred embodiments of the present invention in conjunction with the accompanying drawings and examples.

BRIEF DESCRIPTION OF THE DRAWINGS

FIG. 3 is a schematic view of a OESLM device, according to the present invention, illustrating the electrode patterns deposited on each of the device substrates.

DESCRIPTION OF THE PREFERRED EMBODIMENTS

In the present detailed description, embodiments of the present invention will be discussed with the accompanying figures. It should be noted that this by no means limits the scope of the invention, which is also applicable in other circumstances for instance with other types or variants of methods for laminating a solar cell module or other types or variants of solar cell module than the embodiments shown in the appended drawings. Further, that specific features are mentioned in connection to an embodiment of the invention does not mean that those components cannot be used to an advantage together with other embodiments of the invention.

A first embodiment of a liquid crystal device, according to the present invention, will be described below referring to the FIGS. 2-12.

Figure 1:
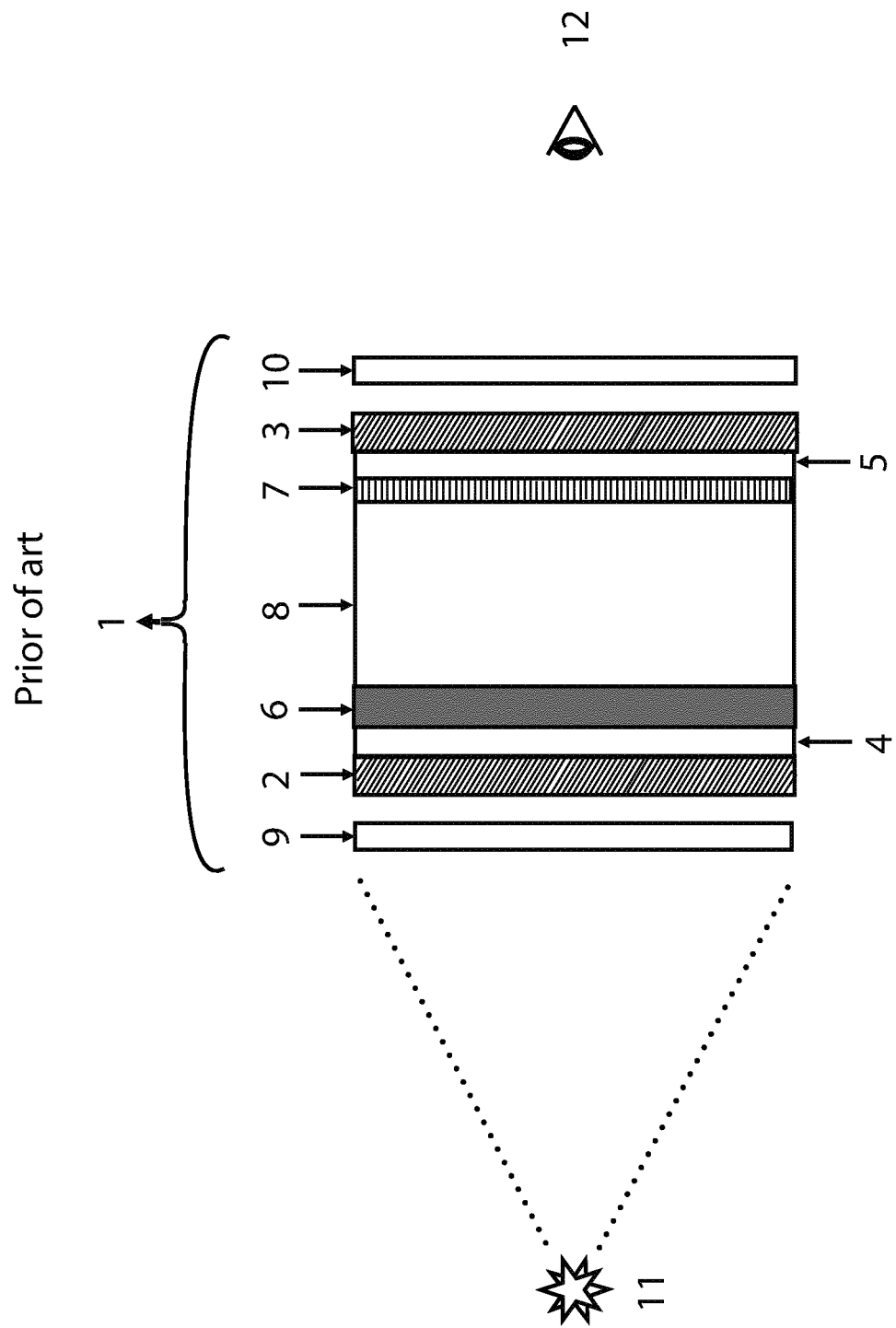
FIG. 1 is illustrating schematically a structure of an optically addressable liquid crystal device (OSLM) prior art.
Figure 2:
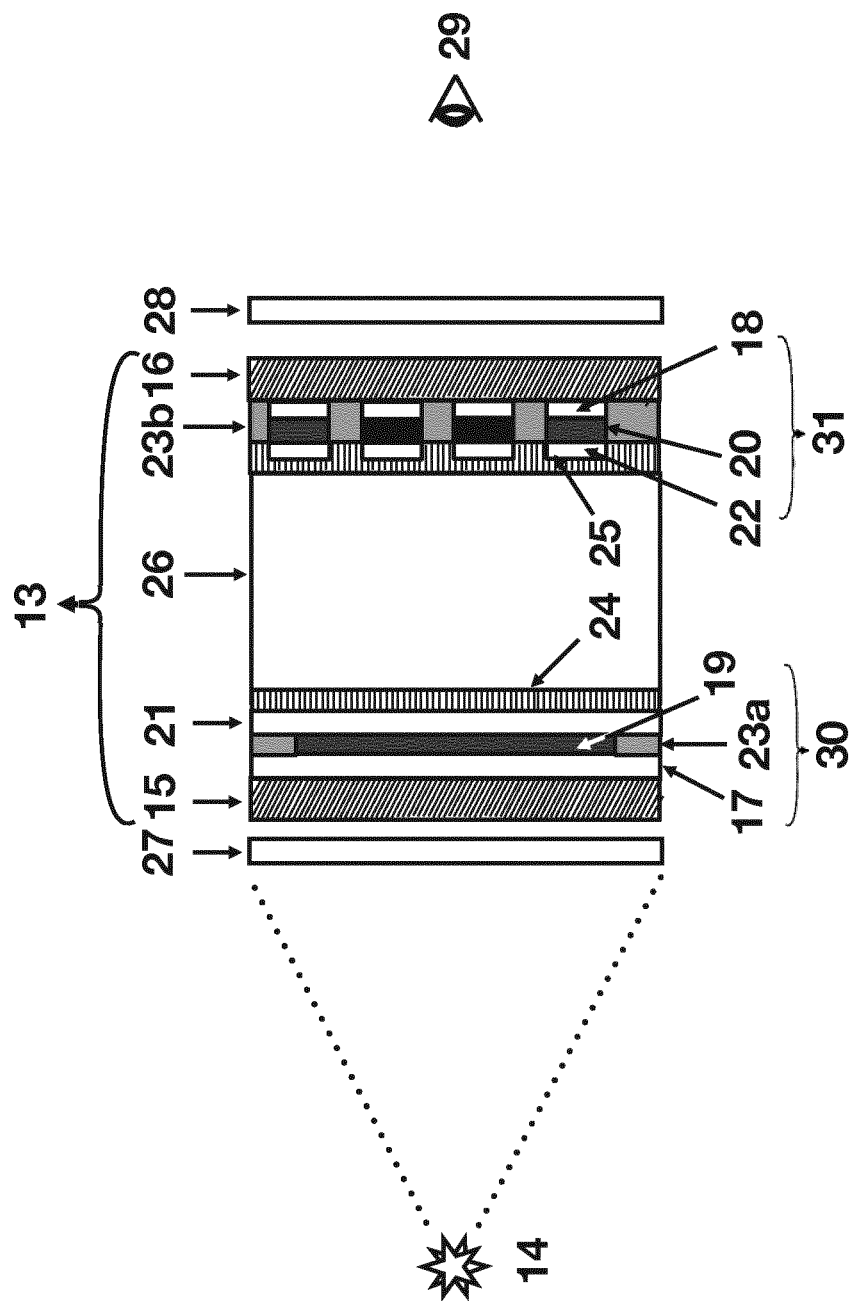
FIG. 2 is illustrating schematically a structure of an optically and electrically addressable liquid crystal (OESLM) device, according to the present invention.
Figure 4:
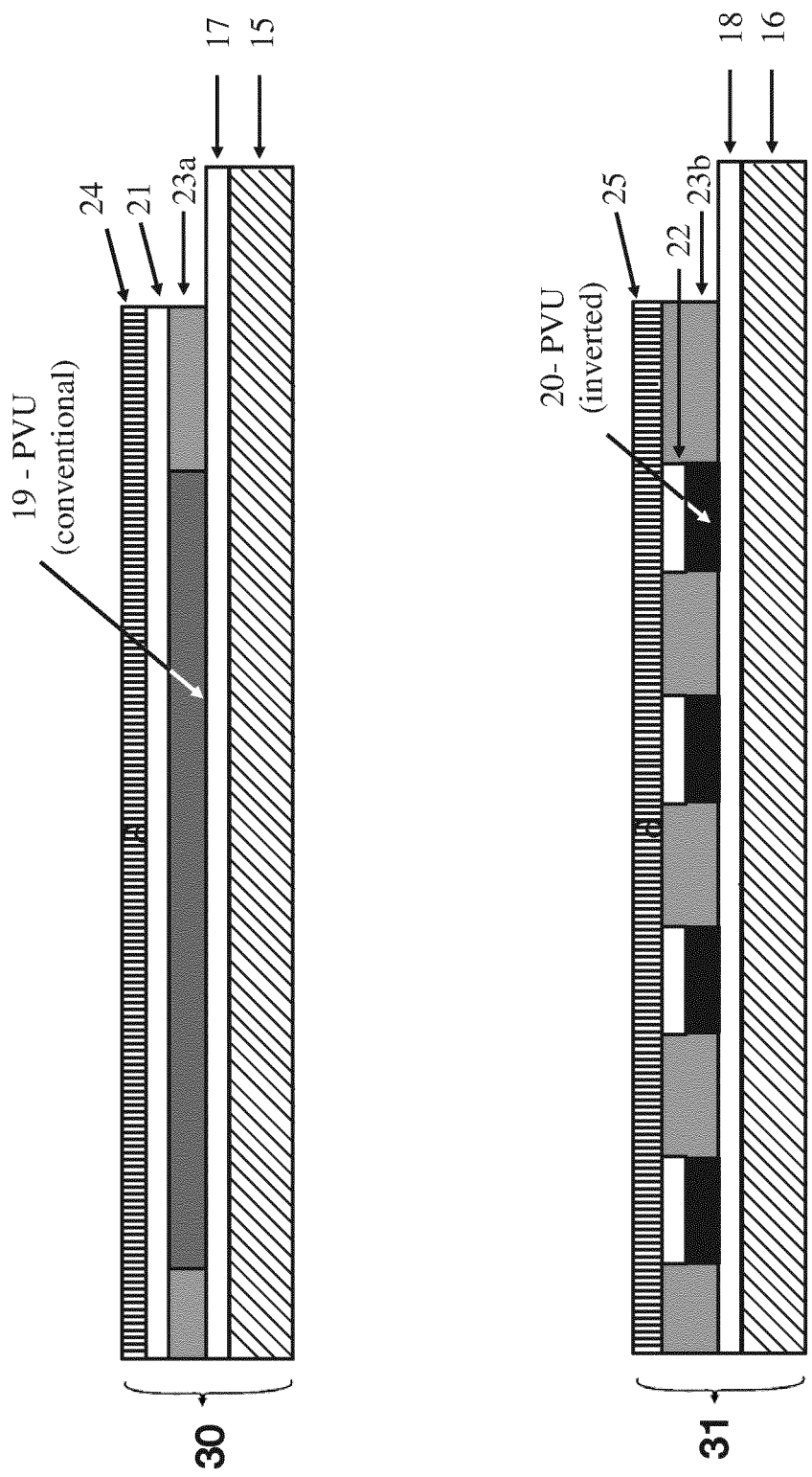
FIG. 4 is a schematic view of a cross section of first and second portions of the OESLM device, respectively, illustrated in FIG. 3.

An electro-optical apparatus using a liquid crystal device, according to this embodiment, depicted in FIG. 2-4, includes an Optically and Electrically Addressed SLM (OESLM) comprising an optically addressable liquid crystal device 13 and a writing light illumination source 14, which is writing data in the OESLM 13 by illumination with light from the light illumination source 14, which could be laser or the ambient light (sun light or artificial light).

According to the present invention, the liquid crystal device is comprising a pair of substrates, at least one of them transparent, covered with electrodes, which at least one of them is transparent, and at least one of them patterned. The electrodes deposited onto the substrates are covered with photovoltaic (PV)semiconductor conversion layer. The PV layer onto the patterned electrodes is covered by transparent conductive layer.

When the both substrates of OESLM device are pre-coated with transparent electrodes in form of parallel stripe pattern, the device substrates are oriented in such way, with respect to each other, that the electrodes on the substrates are forming orthogonal X-Y matrix. On the top of the stripe electrodes of one of the substrates are deposited conventional PV layer, whereas on the stripe electrodes of the other substrate are deposited inverted PV layer.

A further objective of the present invention is that the PV layer deposited on the stripe electrodes of both substrates is discontinuous, forming plurality of single PV units (PVU) along the electrode, which are localised within the areas of the cross-section of the electrodes of the both substrates, so called X-Y matrix pixels. Each XY matrix pixel includes at least one conventional PVU, deposited on one of the substrates, and at least one inverted PVU, deposited on the other substrates. The PVUs deposited onto both substrates are oriented within each pixel in such way that they are preferably not overlapping. Hence, part of each pixel is free of PVUs and thus free of light absorption, which results in a substantial increase of the total light transmission or reflection properties of OESLM device at weak intensity of illumination as well as at absence of applied external electric field.

The OESLM, according to an exemplary embodiment of the present invention, comprises a pair of parallel transparent glass substrates 15 and 16 assembled parallel to each other, to form a sandwich cell with cell gap defined by spacers (not shown), and sealed by a glue (not shown). The inner surface of the substrates 15 and 16 are covered with electrodes thereon.

Whereas the electrode 17 is deposited onto substrate 15 covering the entire substrate surface, the electrode pattern 18, deposited onto the substrate 16, consists of parallel disconnected conductive stripes, separated at predetermined distance (FIG. 4). The substrates of OESLM 13 are assembled in a sandwich cell with their electrodes thereon facing to each other. The electrodes 17 and 18 are covered thereon with photovoltaic semiconductor layers 19 and 20, respectively, which function is to generate charge carriers (electrons and holes) and it contains charge transportation layers (not shown in the figures) for transportation the charges at large mobility to the electrodes 17 and 18, and to the electrodes 21 and 22, respectively.

The respective photovoltaic semiconductor layer, the so called photovoltaic unit (PVU), deposited on the electrodes 19 and 20 thereon is of conventional and inverted type of PVU, respectively. The top of these PVUs are covered with electrons 21 and holes 22 conductive layers, respectively. As a result, a photo-generate potential difference (bias), defined as photo-voltage Vph, appears between the conductive layers (electrodes) 21 and 22. Alignment layers 24 and 25 are deposited onto the whole substrate area bearing the electrodes. The gap of the sandwich cell, formed by the substrates 15 and 16, is filled by a liquid crystal 26 which is oriented in a predeterminate configuration by the alignment layer 24 and 25 deposited onto the inner substrates' surface. The preferred directions of alignment of the liquid crystal 26, imposed by the alignment layer 24 and 25, respectively, are orthogonal to each other so that the liquid crystal layer 26 adopt twisted 90° configuration, the so called twist nematic TN 90° configuration. Well known feature of TN 90° liquid crystal configuration is that it rotates the polarisation plane of the incoming linear polarised light with 90°.

On the outer sides of the liquid crystal cell are disposed a pair of polarisers 27 and 28, respectively, with transmission directions orthogonal to each other, the so called crossed polarisers arrangement. The light coming from the illumination(writing) light source 14 becomes linear polarised after passing the front polariser 27 of OESLM. Entering in the OESLM, the plane of the linearly polarised light is rotated 90° by the TN90° configuration of the liquid crystal layer 26, thus becoming parallel to the transmission direction of the output polariser 28 of the OESLM and therefore passing throughout the OESLM.

This corresponds to the BRIGHT state of OESLM, which take place when the writing light 14 has very low intensity and therefore being not capable to induce photo-voltage Vph high enough to switch the TN 90° liquid crystal figuration to vertical configuration, in which the molecules of a liquid crystal with positive dielectric anisotropy $\Delta\varepsilon>0$ orients along the applied electric field i.e vertical to the substrates. As known the VA molecules configuration is optically isotropic and placed in between cross polarisers looks dark.

When the light intensity of the writing light source 14 is above a certain level, resulting in photo-generated Vph by the PVUs to exceed the threshold voltage Vth of the field-induced liquid crystals alignment transition from TN 90° configuration to vertical configuration, then the polarisation plane of the linearly polarised light, passing through the liquid crystal layer 26, is not anymore rotated by the vertical configuration of the liquid crystal layer and therefore it is extinguished by the output polariser 28. Hence, no light comes throughout the OESLM. This corresponds to the dark state of the OESLM.

When the light source 14 project an image on the OESLM, it will result a photo-voltage Vph pattern distribution over the whole surface area of the OESLM corresponding to the projected image.

In the second embodiment of the present invention, illustrated in FIGS. 3 and 4, the applied external voltage to the stripe electrodes increase/decrease continuously with the electrode number 18, i=1, 2, 3 . . . n. As consequence, upon illumination with writing light 14 with uniform distribution of the light intensity, the stripes with the highest applied external voltage will exhibit the darkest state.

Figure 5:
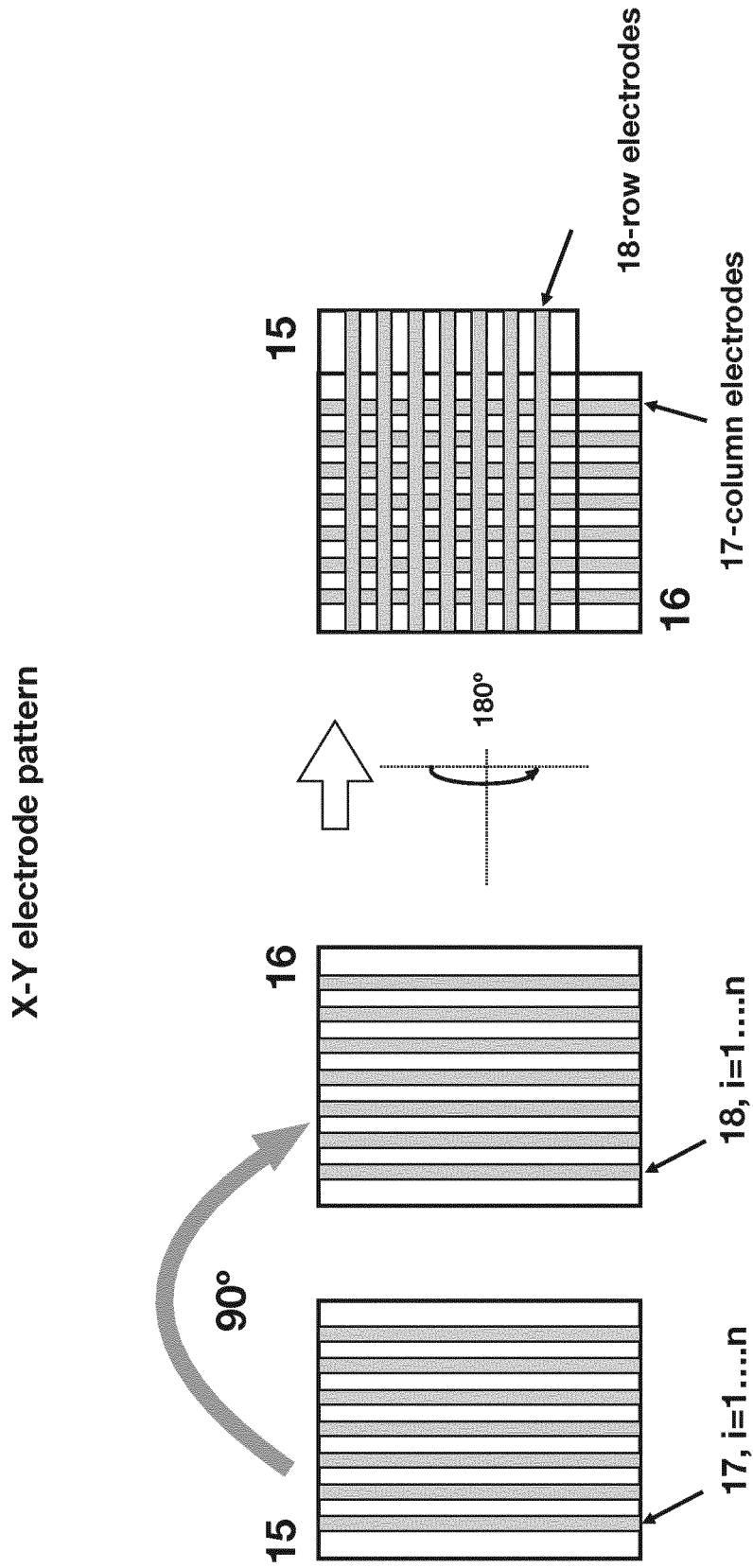
FIG. 5 is a schematic view of a structure of a OESLM device, illustrating the orientation of the OESLM device electrodes, deposited onto both device substrates, with respect to each other.
Figure 6:
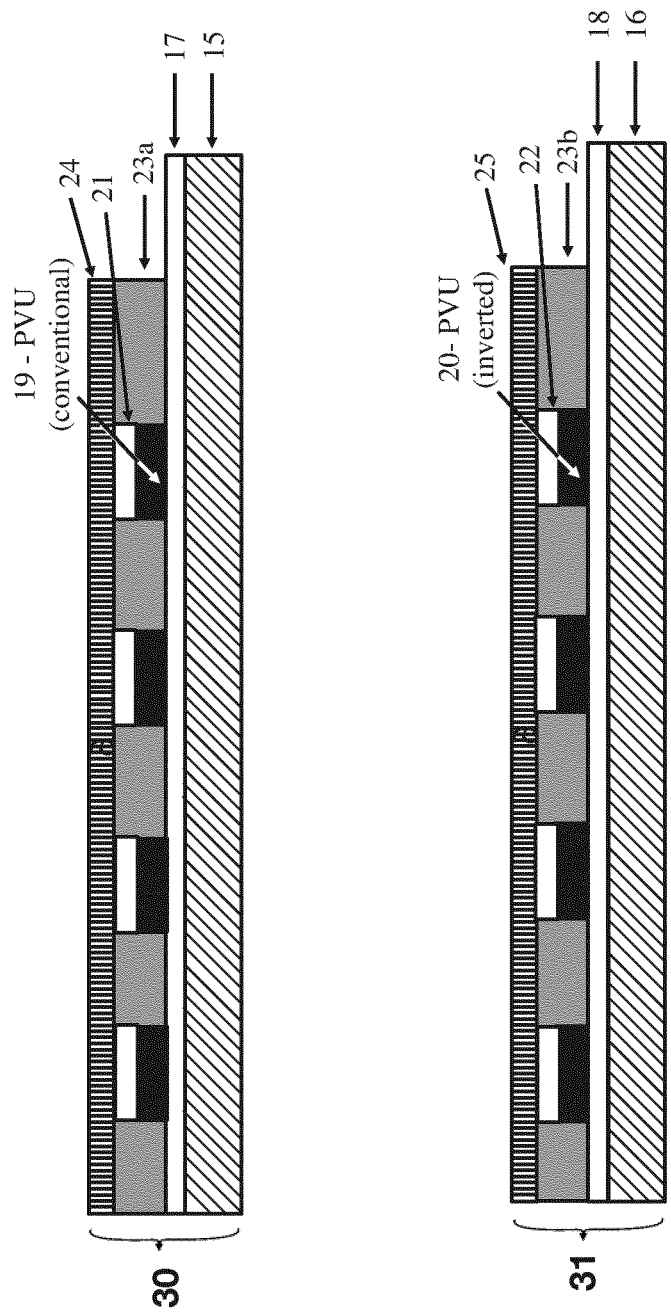
FIG. 6 is a schematic view of a cross section of first and second portions of the OESLM device, respectively, illustrated in FIG. 5.

Another embodiment of OESLM, according to present invention, is depicted in FIGS. 5 and 6. It comprises a pair of parallel transparent glass substrates 15 and 16, both pre-coated with plurality of transparent electrodes in form of parallel disconnected stripes pattern 17, i=1, 2, 3 . . . n and 18, i=1, 2, 3 . . . n, respectively, separated at predetermined distance between them. The substrates of OESLM 13 are assembled in a sandwich cell in such way that their electrodes are forming orthogonal X-Y matrix, with X-rows and Y columns. According to the present invention, on the top of the electrodes of one of the substrates is deposited conventional photo-voltaic semiconductor layer 19, whereas on the top of the electrodes of the other substrate is deposited inverted photo-voltaic semiconductor layer 20, which is schematically depicted in FIG. 6. So that the pixel formed as cross-section of X-row electrode and Y-column electrode will contain a straight photo-voltaic layer 19 and an inverted photo-voltaic layer 20 facing to each other and separated by liquid crystal layer 26 with predeterminate thickness. The advantage of having combination of conventional and inverted photo-voltaic layers in one pixel of the OSLM is that the photo-generated Vph of the conventional photovoltaic layer Vphc is added to the photo-generated Vph of the inverted photovoltaic layer Vphi. Hence, photo-generated Vph equals to Vphc+Vphi will be applied across the liquid crystal layer 26 under illumination by the writing light source 14. Moreover, to each pixel of the OESLM 13 can also be applied an external voltage Vext, using passive X-Y electronic driving applied to the electrodes 21 and 22, respectively. In such way the sensitivity of the addressed pixel will be increased and the pixel could be activated at lower intensity of the incoming light. Moreover, the OESLM can be driven in absence of writing light by applying an electric field to the electrodes 21 and 22, respectively.

Figure 7:
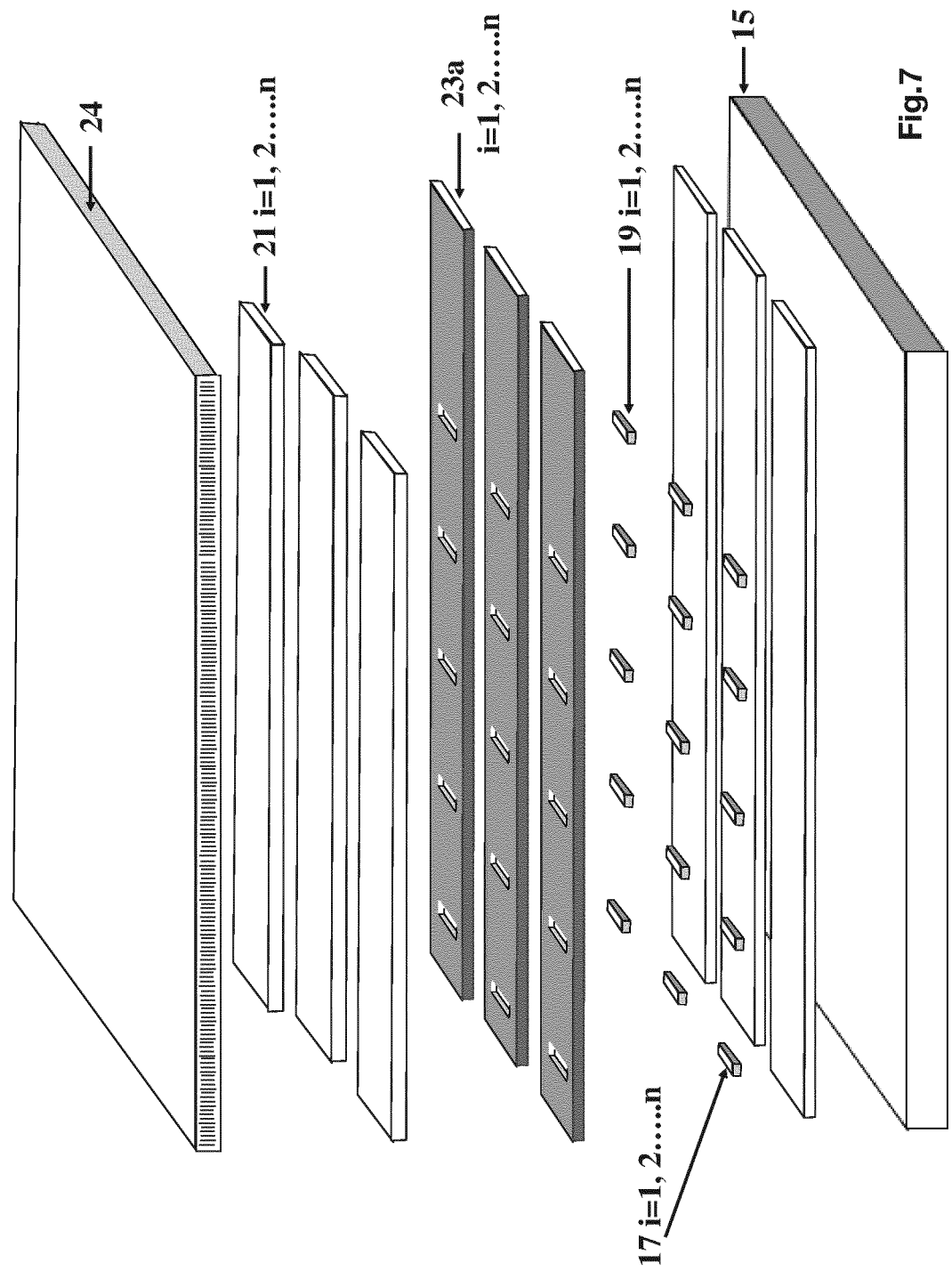
FIG. 7 is illustrating schematically the structure of the deposited elements on the surface of first device portion, which PVUs are oriented perpendicular to the stripe electrodes (for simplicity only three electrode structure is considered). The PVUs are of conventional type.
Figure 8:
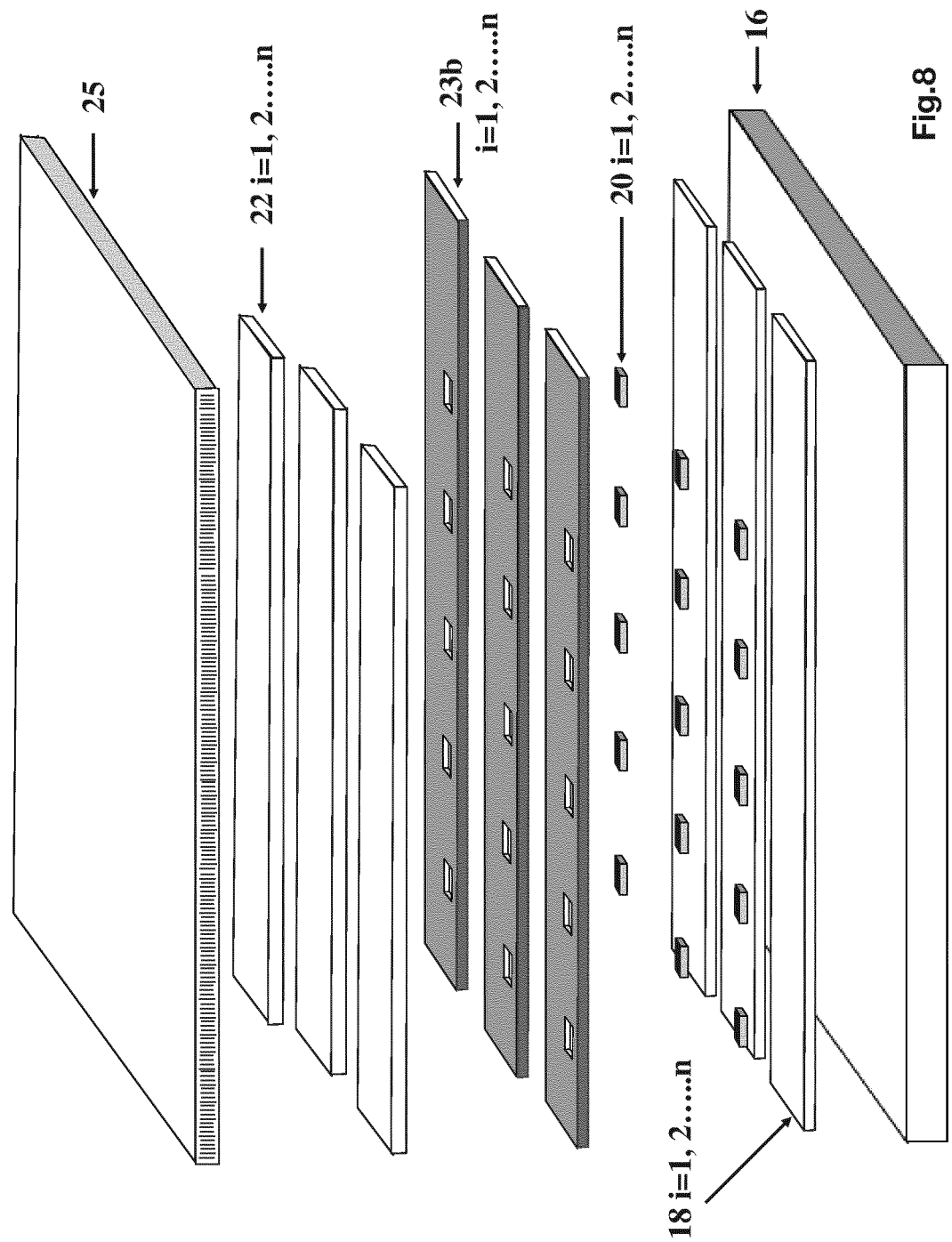
FIG. 8 is illustrating schematically the structure of the deposited elements on the surface of second device portion, which PVUs are oriented parallel to the stripe electrodes (for simplicity only three electrode structure is considered). The PVUs are of inverted type.
Figure 9:
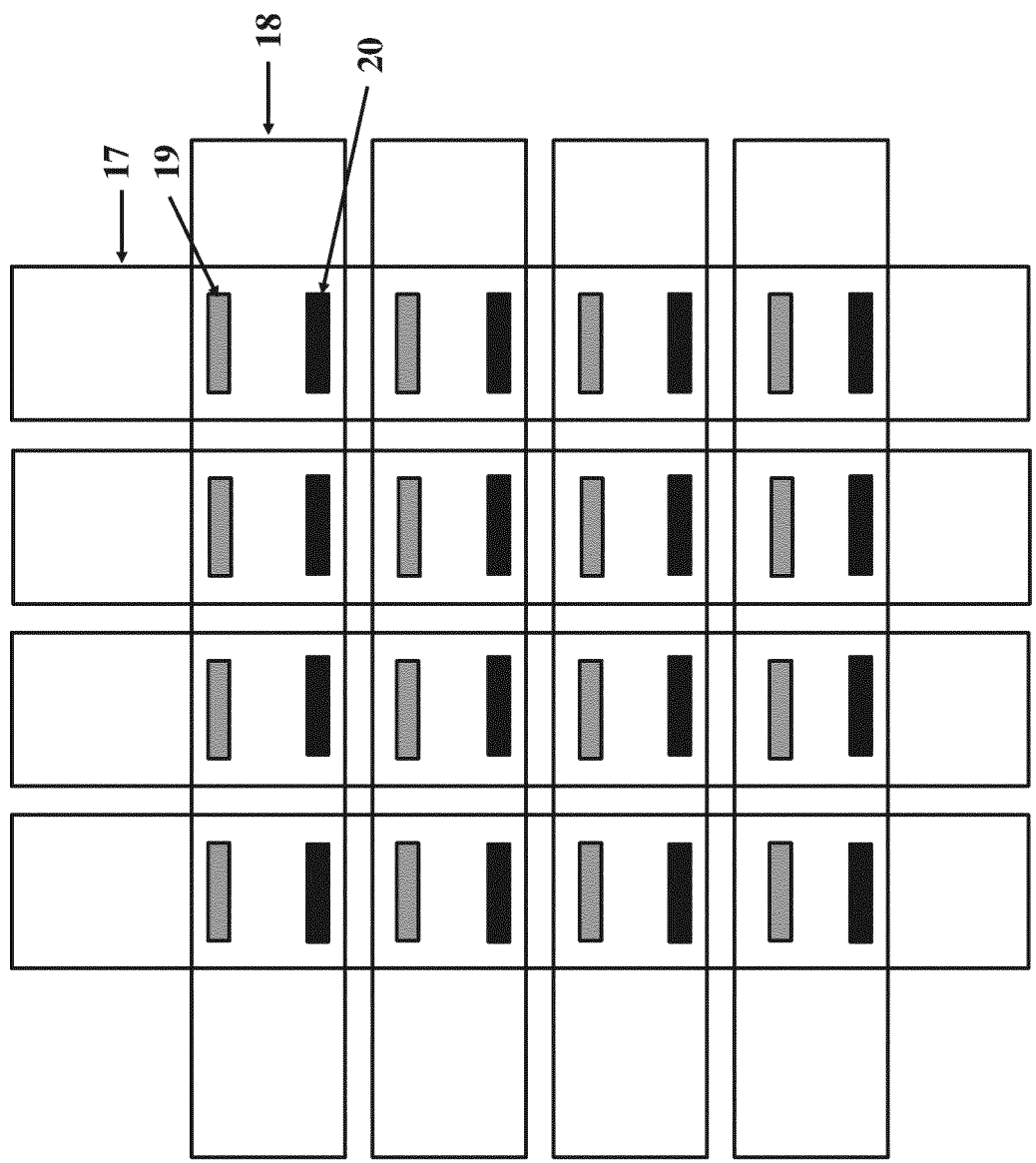
FIG. 9 is illustrating schematically the arrangement of the OESLM device portions, which electrodes are forming XY matrix with pixels, as a cross section of X rows with Y columns. It is depicted the localisation of the PVUs, deposited on both device substrates within the pixels (only the XY matrix, formed by the stripe electrodes and PVUs is shown). The PVUs on one of device portions are of straight type whereas the PVUs on the other device portion are of inverted type.
Figure 10:
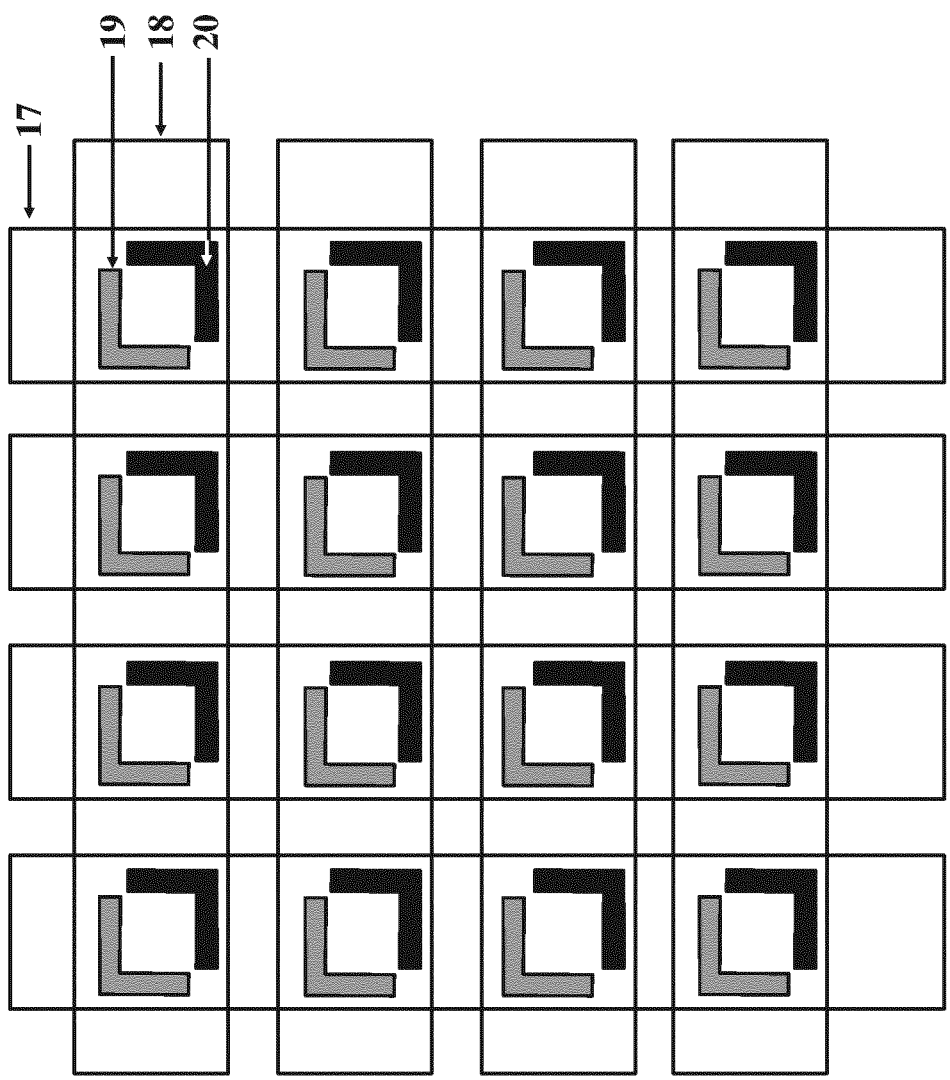
FIG. 10 is illustrating schematically the arrangement of the OESLM device portions from FIG. 9 in which the PVUs have L-form.
Figure 11:
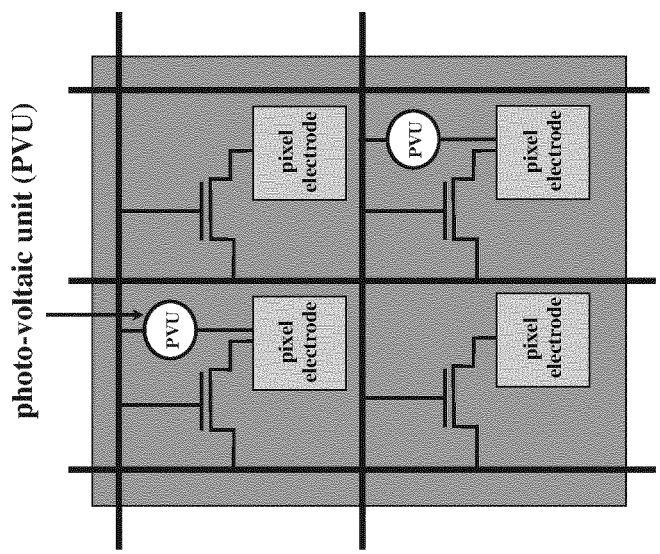
FIG. 11 is illustrating schematically a comparison between a conventional active TFT electronic driving of LCDs a) and OESLM, according the invention, with TFT electronic driving, in which all of the pixels b) or some of them c) are connected to PVU.

Yet another embodiment is depicted in FIGS. 7 and 8, which, according to the present invention, the photo-voltaic layers, conventional and inverted, respectively, deposited onto the electrodes of substrates 15 and 16 of the OESLM, are not anymore continuous and may different shape, as illustrated on FIGS. 9 and 10. These photo-voltaic layers are patterned in such way that within each pixel of OESLM are situated conventional and inverted photovoltaic units (PVU), which are not overlapping and are not covering the whole pixel area. In such way, an essential part of the pixel will be fully transparent since the PVUs (conventional and inverted) are usually strongly absorbing the light in the visible light spectrum. Hence the transparency of the OESLM containing patterned photo-voltaic semiconductor layers, straight and inverted, respectively, will be with higher light transparency compared to the OESLM covered by continuous PVUs. The PVUs on the substrates are isolated from each other by insolation layer 23 a and b, as shown on FIG. 6. OESLM with such X-Y electrodes, which are covered by patterned photo-voltaic semiconductor layers with transparent conductive layer on top of them, enables also an electronic addressing of the OSLM and hence, displaying a complementary information content parallel to the one, which is optically written. Moreover, such a complementary electronic driving makes it possible to enhance the light sensitivity of the OSLM and/or correct the optically written images electronically.

Another embodiment of the present invention is that the patterned PVU unit within each pixel might be more than one being either of conventional and inverted kind, respectively, with different absorption spectrum.

Active TFT Matrix Driving

Figure 12:
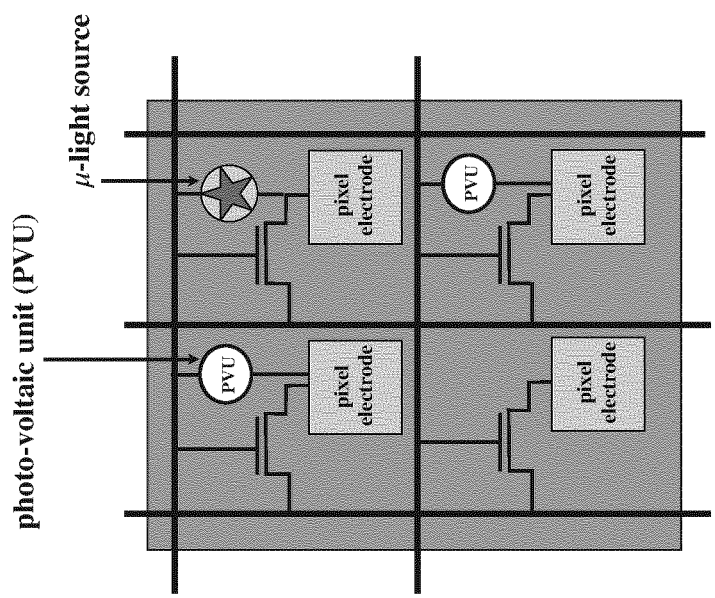
FIG. 12 is illustrating schematically the incorporated light source into the device pixels, according to the invention.

Another embodiment is related to use of active TFT matrix for electronic driving OESLM, according to the present invention, which can be controlled externally by e.g. BlueTooth technique. In According to the present invention, the electrode structure of the TFT OESLM, depicted in FIG. 12, is generally similar to the one in TFT LCDs with the substantial difference that each pixel contains a PVU (photovoltaic unit) connected to the pixel electrode directly or through the TFT element. Moreover, the structure of the other substrate of the TFT OESLM, bearing the common electrode, may also contain PVU(s), likewise OESLM described in the previous embodiment. The localisation of these PVUs deposited onto this substrate have to be within the pixel area of the TFT substrate.

According to the present invention, TFT OESLM device enables optical, electrical and mixed optical and electrical addressing for displaying alpha-numeric as well as images by this device.

According the present invention, the polariser 28 of OESLM device at the back side of the liquid crystal device is of transparent, transreflective or reflective type, respectively, depending on the required device performance.

There are several other liquid crystal display (LCD) modes, which, instead of two polarisers, as in the TN 90° LCD mode described in this invention, require one or no polarisers at all. Most of these effects, however, possess a higher Vth than the TN90° effect, described in this invention. Yet another embodiment, according to the present invention, is an OESLM with structure depicted in FIGS. 7 and 8, in which the single conventional and inverted PVUs respectively, in each pixel of the device, are replaced by tandems of such PVUs.

The number of the PVUs in the tandem, depends on the required magnitude of the generated Vph, for switching the liquid crystal layer 26 in case another LCD mode with higher Vth is employed.

Another embodiment, according to the invention, is to provide the OESLM device with additional function as a complex controllable light source, by incorporating in some of device pixels or, preferably, in all of them, light source powered by the energy produced by PVU during the day and stored for use during the night. If needed, the EOSLM device could additionally be supplied with power from external source.

Herein below, the present invention will be described based on specific examples.

Experimental OSLM Samples Containing Photovoltaic Semiconductor Conversion Units.

Samples of OSLMs were prepared in the following way.

Glass substrates, pre-coated with thin transparent conductive ITO layer (5 Ω/cm2), were cut with size 20×30 mm. The substrates were first cleaned from mechanical particles in ultrasonic bath and washed in detergent solution.

After rinsing in deionised water, the substrates are dried in clean dry nitrogen and treated by ozone cleaner. By means of photolithography, on one of the substrates was formed an electrode with size 12.75×12.75 mm, whereas the electrode on the other substrate was formed as a pattern consisting of parallel stripes with size 6×6 mm separated at 1.5 mm between them.

On the substrates' surface, bearing the electrodes, were deposited photovoltaic semiconductor conversion layer, which generally is consisting of BHJ (Bulk Hetero Junction—a semiconductor mixture) layer, which function is to generate charge carriers (electrons and holes), disclosed between charge transportation layers for transportation of electrons and holes, respectively, at large mobility to the electrodes 17, 19 and 21,22, respectively.

In our samples, the photovoltaic semiconductor conversion layer, the so called photovoltaic unit (PVU), is a sandwich consisting of electron transporting layer, Donor/acceptor, BHJ and hole transporting layer.

Depending on the type of PVU, conventional or inverted, as electron transporting layer is usually used ZnO or polyethylenimine ethoxylated (PEIE). A mixture of donor and acceptor semiconductor materials are forming the Bulk Hetero Junction (BHJ) part, the active part of photo-voltaic semiconductor conversion layer. In the scientific as well as in the patent literature [US 2014/0028957 A1, US 2016/0260919 A1] are described a number of such materials and combinations of donor and acceptor materials such as poly (3-hexylthiophene) (P3HT): phenyl C61-butryric acid methyl ester (PCBM), thieno[3,4-b]thiophene/benzodithiophene (PTB7):[6,6]-phenyl C71-butyric acidmethyl ester (PC71BM)-based materials, which are very often used in BHJ (active) part of the photo-voltaic semiconductor conversion layer, the PVU. As hole transporting layer in many cases are used poly(3,4-ethylenedioxythiophene): poly(styrenesulfonate) (PEDOT:PSS), MoO3, Ag, etc. For instance, photovoltaic active layer consisting of PcZ(polycarbazole): PCBM (1:4) disposed between ITO and PEDEOT:PSS, generates Vph about 1V at illumination with light intensity of 100 mW/cm2.

Example 1

Onto the sample substrates' surface, facing the liquid crystal, are deposited electrodes 17 and 18, respectively, made of transparent conductive ITO layer. The electrodes 17 and 18 are consisting of parallel stripe electrodes separated at distance 1.5 mm from each other. The sample substrates are assembled in such way that the stripe electrodes on one of the substrates are orthogonal to the stripe electrodes of the other substrate. The electrodes 17 on the sample substrate 15 are covered by conventional PVU, whereas the electrodes 18 on the sample substrate 16 are covered by PVU of inverted type.

In our samples, the photo conversion semiconductor mixture poly(3-hexylthiophene)(P3HT): phenyl C61-butryric acid methyl ester (PCBM) (1:1) was used as BHJ, which was sandwiched between electron transporting layer (ETL) and hole transporting layer (HTL). ITO/PEDOT:PSS was used as hole transporting layer (HTL) in the conventional PVU, whereas in the inverted cell, MoO3 was used as HTL. In the conventional PVU was used Al as electron transporting layer (ETL), whereas ITO/TiOx was used as ETL in the inverted PVU. On top of the electrodes is deposited transparent ITO layer 21 and 22, respectively. The electrodes with PVU on top of which deposited ITO electrodes, are separated from each other by an insulation layer 23a and b, respectively. Whole substrates' area finally was covered by alignment layer for promoting planar alignment of the liquid crystal.

Before assembling the substrates in a sandwich cell, their surface was unidirectionally rubbed with cloth along the electrodes. The substrates were assembled in a sandwich cell with cell gap of about 4 μm, with electrodes on one of the substrates being orthogonal to the electrodes of the other substrates. Due to this arrangement, the liquid crystal filled in the cell gap adopts TN 90° configuration. The liquid crystal filled the cell possesses positive dielectric anisotropy about 16 and it is containing small concentration of chiral dopant in order to avoid reverse twist in the samples. The threshold voltage Vth of this liquid crystal mixture is about 1.05 V.

When illuminating the sample with light, in the illuminated area of the sample generates Vph,total (over the liquid crystal layer 26), which is the sum of Vph19 (Vph generated by the PVU unit deposited on the substrate 15)+Vph20 (Vph generated by the PVU unit on the substrate 16). When the generated by the illumination Vph,total, exceeds the Vth needed for switching liquid crystal, the optical properties of the sample in the illumination area will be changed. The Vph,total was measured tone about 1.3V at 100 mW/cm2.

This voltage was enough high to switch the liquid crystal from TN90° configuration to vertical configuration. Thus, placing the sample between crossed polarisers of transmissive type, the sample switches from BRIGHT to DARK state. If the intensity of the writing light is low than by applying additional bias to a selected stripe electrode(s) the sensitivity of the PVU deposited onto this electrode(s) will increase or decrease, depending on the applied field polarity.

In absence of light the OESLM was addressed electronically by applying voltage to electrodes 21 and 22, as in the case of passive matrix addressing LCDs.

For further increasing the photo-induced voltage Vph applied to the liquid crystal 11, instead of single conventional or inverted PVU, tandem of such PVUs might be employed.

Example 2

The same sample as the one described in example 1 but the polariser 28 is of trans-reflective type.

The invention claimed is:

1. A liquid crystal device comprising:
   a first portion,
   a second portion, and
   a liquid crystal layer;
   wherein:
      said first portion includes a first substrate, said first substrate being at least partially covered by a first electrode layer;
      said second portion includes a second substrate, said second substrate being at least partially covered by a second electrode layer;
      at least one of said first and second electrode layers includes a plurality of electrodes that are electrically insulated from each other;
      the at least one of said first and second electrode layers is at least partially covered by at least one photovoltaic semiconductor conversion layer;
      the at least one of said first and second portions is transparent;
      said first portion is substantially parallel to said second portion; and
      said liquid crystal layer is disposed between said first and second portions,
   wherein a first photovoltaic conversion semiconductor layer is arranged between said first electrode layer and said liquid crystal layer and/or a second photovoltaic conversion semiconductor layer is arranged between said second electrode layer and said liquid crystal layer, wherein the photovoltaic conversion semiconductor layer deposited on the first portion is a conventional PV layer, whereas the photovoltaic conversion semiconductor layer deposited on the second portion is an inverted PV layer.

2. A liquid crystal device according to claim 1, wherein:
   said first electrode layer includes a first plurality of electrodes that are electrically insulated of each other,
   said second electrode layer includes a second plurality of electrodes that are electrically insulated of each other,
   said first plurality of electrodes are extended in a first longitudinal direction,
   said second plurality of electrodes are extended in a second longitudinal direction, and
   said first longitudinal direction is orthogonal to said second longitudinal direction.

3. A liquid crystal device according to claim 1, wherein:
   said first portion includes a first transparent conductive layer arranged in physical contact with and at least partially covering a first photovoltaic conversion semiconductor layer; and
   said second portion includes a second transparent conductive layer arranged in physical contact with and at least partially covering a second photovoltaic conversion semiconductor layer.

4. A liquid crystal device according to claim 3, wherein:
   said first transparent conductive layer includes a plurality of transparent electrodes that are electrically insulated of each other and extended in said first longitudinal direction;
   said second transparent conductive layer includes a plurality of transparent electrodes that are electrically insulated of each other and extended in said second longitudinal direction;
   said first photovoltaic conversion semiconductor layer includes a first plurality of photovoltaic conversion semiconductor elements that are electrically insulated of each other and extended in at least said first longitudinal direction;
   said second photovoltaic conversion semiconductor layer includes a second plurality of photovoltaic conversion semiconductor elements that are electrically insulated of each other and extended in at least said second longitudinal direction; and
   said first plurality of electrodes at least partially overlaps with first plurality of transparent electrodes and said first plurality of photovoltaic conversion semiconductor elements, and said second plurality of electrodes at least partially overlaps with second plurality of transparent electrodes and said second plurality of photovoltaic conversion semiconductor elements.

5. A liquid crystal device according to claim 1, wherein:
   said first photovoltaic conversion semiconductor layer includes a first plurality of photovoltaic conversion semiconductor elements that are electrically insulated of each other in first longitudinal direction and second longitudinal direction such that said first plurality of photovoltaic conversion semiconductor elements are distributed in a first plane coinciding with said first photovoltaic conversion semiconductor layer;
   said second photovoltaic conversion semiconductor layer includes a second plurality of photovoltaic conversion semiconductor elements that are electrically insulated of each other in said first longitudinal direction and second longitudinal direction such that said second plurality of photovoltaic conversion semiconductor elements are distributed in a second plane coinciding with said second photovoltaic conversion semiconductor layer; and
   said first plane and said second plane are parallel; and wherein said first plurality of photovoltaic conversion elements and said second plurality of photovoltaic conversion elements are insulated of each other and spaced at least along a direction orthogonal to said first plane and said second plane.

6. A liquid crystal device according to claim 1, wherein:
one of said first and second plurality of electrodes or one of first and second plurality of transparent electrodes are thin film transistor (TFT) driven transparent pixel electrodes and one of said first and second plurality of electrodes or one of first and second plurality of transparent conductive electrodes are common transparent electrodes with system of colour filters and black mask beneath, and
said thin film transistor driven conductive transparent pixel electrodes are driven simultaneously or independently by said first or second plurality of photovoltaic conversion semiconductor elements.

7. A liquid crystal device according to claim 1, wherein:
at least one of first and second photovoltaic conversion semiconductor layers has a laminated structure comprising a photovoltaic semiconductor layer for charge generation enclosed between two thin films made of charge transporting material.

8. A liquid crystal device according to claim 1, further comprising two polarisers, wherein:
each of said two polarisers is either transmissive or transreflective, and said first and second portions are arranged between said two polarisers.

9. A liquid crystal device, according to claims 1, wherein transparent conductive layers are connected to an electronic driving system.

10. A liquid crystal device according to claim 1, further comprising:
a means for storing electrical energy, and at least one light source connected to said means for storing electrical energy.

11. A liquid crystal device according to claim 1, further comprising a means for receiving external electromagnetic signals.

\* \* \* \* \*